(12) United States Patent
Vasiloglou et al.

(10) Patent No.: US 10,366,344 B1
(45) Date of Patent: Jul. 30, 2019

(54) SYSTEMS AND METHODS FOR SELECTING FEATURES FOR CLASSIFICATION

(71) Applicant: Symantec Corporation, Mountain View, CA (US)

(72) Inventors: Nikolaos Vasiloglou, Atlanta, GA (US); Jugal Parikh, Mountain View, CA (US); Andrew Gardner, Rosewell, GA (US)

(73) Assignee: Symantec Corporation, Mountain View, CA (US)

( * ) Notice: Subject to any disclaimer, the term of this patent is extended or adjusted under 35 U.S.C. 154(b) by 644 days.

(21) Appl. No.: 15/087,743

(22) Filed: Mar. 31, 2016

(51) Int. Cl.
*G06N 20/00* (2019.01)
*G06F 17/16* (2006.01)

(52) U.S. Cl.
CPC .............. *G06N 20/00* (2019.01); *G06F 17/16* (2013.01)

(58) Field of Classification Search
CPC combination set(s) only.
See application file for complete search history.

(56) References Cited

U.S. PATENT DOCUMENTS

2013/0326625 A1* 12/2013 Anderson ................ G06F 21/56 726/23

OTHER PUBLICATIONS

Beaton, The Use of Special Matrix Operators in Statistical Calculus, Research Bulletin, 1964. (Year: 1964).*

J.H. Goodnight, The Sweep Operator: Its Importance in Statistical Computing, SAS Technical Report R-106 (1978) (Year: 1978).*
Lei Yu et al., Feature Selection for High-Dimensional Data:A Fast Correlation-Based Filter Solution, Proceedings of the 20th International Conference on Machine Learning (ICML-2003) (Year: 2003).*
Gestel et al., Benchmarking Least Squares Support Vector Machine Classifiers, Machine Learning, 54, p. 5-32, 2004. (Year: 2004).*
Foster et al., Variable Selection in Data Mining: Building a Predictive Model for Bankruptcy, pp. 1-27, Jan. 2004 (Year: 2004).*
Simila, Timo, Advances in Variable Selection and Visualization Methods for Analysis of Multivariate Data, pp. 1-61, Oct. 2007. (Year: 2007).*
Freeman, Charlton, Multivariate and Naive Bayes Text Classification Aprpoach to Cost Growth Risk in Department of Defense Acquisition Programs, Air Force Institute of Technology, pp. 1-156, Mar. 2013. (Year: 2013).*

(Continued)

*Primary Examiner* — Kakali Chaki
*Assistant Examiner* — Marshall L Werner
(74) *Attorney, Agent, or Firm* — FisherBroyles, LLP

(57) ABSTRACT

A computer-implemented method for selecting features for classification may include (1) generating a matrix X, a column vector Y, and a matrix Z from a training dataset that includes a plurality of samples with a plurality of features, (2) generating an augmented matrix from the matrix X, the column vector Y, and the matrix Z, (3) identifying one or more most-relevant features from the plurality of features by iteratively applying a sweep operation to the augmented matrix, and (4) training a classification model using the most-relevant features from the plurality of features rather than all of the plurality of features. Various other methods, systems, and computer-readable media may have similar features.

20 Claims, 11 Drawing Sheets

(56) References Cited

OTHER PUBLICATIONS

Regularization: Ridge Regression and the LASSO, Statistics 305 Autumn Quarter 2006/2007 Notes, Nov. 2006. (Year: 2006).*

J. H. Goodnight, The Sweep Operator: Its Importance in Statistical Computing, https://support.sas.com/documentation/onlinedoc/v82/techreport_r106.pdf, SAS Technical Report R-106, (1978).

Lei Yu et al., Feature Selection for High-Dimensional Data: A Fast Correlation-Based Filter Solution, http://www.aaai.org/Papers/ICML/2003/ICML03-111.pdf, Proceedings of the Twentieth International Conference on Machine Learning (ICML-2003), (2003).

Francois Fleuret et al., Fast Binary Feature Selection with Conditional Mutual Information, http://www.jmlr.org/papers/volume5/fleuret04a/fleuret04a.pdf, (2004).

Dunja Mladenic et al., Feature Selection using Linear Classifier Weights: Interaction with Classification Models, http://citeseerx.ist.psu.edu/viewdoc/download?doi=10.1.1.85.2088&rep=rep1&type=pdf, SIGIR'04, (Jul. 25-29, 2004).

Minh Hoai Nguyen et al., Optimal feature selection for support vector machines, http://www.robots.ox.ac.uk/~minhhoai/papers/SVMFeatureWeight_PR.pdf, Pattern Recognition 43 (2010), (Sep. 1, 2009).

James P. Geaghan, Matrix Structure and Notation, http://statweb.lsu.edu/faculty/geaghan/EXST7015/Fall2004/HTML/06d-MatrixAlgebraIntro.html, as accessed Feb. 10, 2016, (on or before Aug. 16, 2004).

Sweep Operator, http://support.sas.com/documentation/cdl/en/statug/63347/HTML/default/viewer.htm#statug_intromod_a0000000356.htm, as accessed Feb. 10, 2016, SAS/STAT(R) 9.22 User's Guide, SAS Institute Inc, (May 24, 2010).

K. Lange, Linear Regression and Matrix Inversion, http://www.stat.ubc.ca/~ruben/data/Stat560_2010/KennethLange/lange10_ch07.pdf, Numerical Analysis for Statisticians, Statistics and Computing, (2010).

Sums of Squares and Cross Products Matrix, http://stattrek.com/matrix-algebra/sums-of-squares.aspx, as accessed Feb. 10, 2016, (Jan. 2, 2010).

OLS in Matrix Form, https://web.stanford.edu/~mrosenfe/soc_meth_proj3/matrix_OLS_NYU_notes.pdf, as accessed Feb. 10, 2016, (Aug. 18, 2014).

Chapter 5: Matrix Approaches to Simple Linear Regression, http://jonathantemplin.com/files/glm1/psyc790f06_lecture17.pdf, as accessed Feb. 10, 2016, Lecture 17, Psychology 790, The University of Kansas, (Nov. 9, 2006).

Regression with Matrix Algebra, http://faculty.cas.usf.edu/mbrannick/regression/regma.htm, as accessed Feb. 10, 2016, (Nov. 11, 2014).

Residual Analysis in Regression, http://stattrek.com/regression/residual-analysis.aspx?Tutorial=AP, as accessed Feb. 10, 2016, (Mar. 5, 2012).

Explained sum of squares, https://en.wikipedia.org/wiki/Explained_sum_of_squares, as accessed Feb. 10, 2016, Wikipedia, (Dec. 15, 2005).

3.1 Least squares in matrix form, http://global.oup.com/booksites/content/0199268010/samplesec3, as accessed Feb. 10, 2016, 3 Multiple Regression, (Nov. 16, 2013).

* cited by examiner

FIG. 6

Augmented Matrix
216

$$\begin{bmatrix} Y^TY & Y^TZ & Y^T\mathbf{1} \\ Z^TY & I+Z^TZ & Z^T\mathbf{1} \\ \mathbf{1}^TY & \mathbf{1}^TZ & N \end{bmatrix}$$

FIG. 8

| Augmented Matrix 216 | | | |
|---|---|---|---|
| $Y^TY$ 902 | $Y^TZ$ 904 | $Y^T\mathbf{1}$ 906 | |
| | | | |
| $Z^TY$ 912 | $I+Z^TZ$ 914 | $Z^T\mathbf{1}$ 916 | |
| $\mathbf{1}^TY$ 922 | $\mathbf{1}^TZ$ 924 | N 926 | |

*FIG. 9*

SYSTEMS AND METHODS FOR SELECTING FEATURES FOR CLASSIFICATION

BACKGROUND

Classifying entities based on their features is important in many fields. For example in the field of computer security, classifying files and websites as either malicious or benign and/or classifying computing devices as being infected or clean may be vital in protecting personal and sensitive data. Using various machine-learning techniques, training datasets containing examples with known classifications may be used to train classification models to predict the classifications of new observances. To train a classification model, features of the examples with known classifications may be analyzed to derive a function that predicts a new observance's classification based on its features.

The examples within training datasets often have large numbers of features, many of which may be irrelevant to the examples' or new observances' classifications. Unfortunately in many instances, the computational cost of training a classification model may increase polynomially with the number of features used to train the classification model. Additionally, using irrelevant features to train a classification model may result in a classification model that is over fitted and insufficiently generalized to predict the classifications of new observances. For these and other reasons, the selection of a subset of all available features that should be used to train a classification model is generally considered an important step in training most classification models.

Many methods for selecting and ranking the relevance of features exist. Generally, methods for selecting and ranking features are performed in a stepwise fashion and require linear to quadratic number of estimations of a classification model. For example using forward feature selection, the most relevant feature for predicting a classification may be selected from a set of possible features by (1) training classification models using each possible feature and (2) determining which feature's classification model is most accurate. Then, the second most relevant feature may be selected from the remaining features by (1) training classification models using two-feature combinations of the most relevant feature and each remaining feature and (2) determining which remaining feature's classification model is most accurate. The remaining features may be ranked in a similar manner. Because of the quadratic nature of many feature-selection methods, their use in selecting and ranking more than a small number of features may be prohibitively expensive. The instant disclosure, therefore, identifies and addresses a need for improved systems and methods for selecting features for classification.

SUMMARY

As will be described in greater detail below, the instant disclosure describes various systems and methods for selecting features for classification. In one example, a computer-implemented method for selecting features for classification may include (1) generating a matrix X, a column vector Y, and a matrix Z from a training dataset that includes a plurality of samples with a plurality of features, (2) generating an augmented matrix from the matrix X, the column vector Y, and the matrix Z, (3) identifying one or more most-relevant features from the plurality of features by iteratively applying a sweep operation to the augmented matrix, and (4) training a classification model using the most-relevant features from the plurality of features rather than all of the plurality of features.

In some embodiments, the training dataset may include a plurality of samples and a classification for each sample, and each sample within the training dataset may have a value for each of a plurality of features of the samples. In certain embodiments, each row of the matrix X may represent one of the plurality of samples, each column of the matrix X may represent one of the plurality of features, each row of the column vector Y may represent the classification for the one of the plurality of samples, and the matrix Z may be generated by multiplying each row of the matrix X with the classification contained in the corresponding row of the column vector Y.

In some embodiments, the step of generating the augmented matrix from the matrix X, the column vector Y, and the matrix Z may be performed such that (1) an upper-left matrix of the augmented matrix is equal to a product of a transpose of the column vector Y and the column vector Y, (2) an upper-middle matrix of the augmented matrix is equal to a product of the transpose of the column vector Y and the matrix Z, (3) an upper-right matrix of the augmented matrix is equal to a product of the transpose of the column vector Y and a matrix of ones, (4) a middle-left matrix of the augmented matrix is equal to a product of a transpose of the matrix Z and the column vector Y, (5) a middle matrix of the augmented matrix is equal to a sum of an identity matrix and a product of a transpose of the matrix Z and the matrix Z, (6) a middle-right matrix of the augmented matrix is equal to a product of a transpose of the matrix Z and the matrix of ones, (7) a lower-left matrix of the augmented matrix is equal to a product of a transpose of the matrix of ones and the column vector Y, (8) a lower-middle matrix of the augmented matrix is equal to a product of a transpose of the matrix of ones and the matrix Z, and (9) a lower-right matrix of the augmented matrix is equal to a number of samples in the plurality of samples.

In some embodiments, the step of training the classification model may include training the classification model to distinguish entities that are malicious from entities that are benign and/or distinguish entities that have been compromised from entities that have not been compromised. In at least one embodiment, the most-relevant features may include a subset of the plurality of features that, when used to train the classification model, contribute most to a reduction of an error of the classification model.

In some embodiments, the step of identifying the most-relevant features from the plurality of features may include ranking the most-relevant features. In certain embodiments, the step of identifying the most-relevant features from the plurality of features may include identifying the most relevant feature from the plurality of features by (1) applying, to an initial state of the augmented matrix for each feature from the plurality of features that is represented in the augmented matrix, the sweep operation to the augmented matrix and (2) determining which application of the sweep operation resulted in the lowest value in the lowest rightmost element of the augmented matrix. In some examples, the most relevant feature may include the feature that is associated with the application of the sweep operation that resulted in the lowest value in the lowest rightmost element of the augmented matrix.

In some embodiments, the step of identifying the most-relevant features from the plurality of features may include identifying the second most relevant feature from the plurality of features by (1) generating a second state of the augmented matrix by applying the sweep operation to the augmented matrix, (2) reapplying, to the second state of the augmented matrix for each remaining feature from the plurality of features, the sweep operation to the augmented matrix, and (3) determining which reapplication of the sweep operation resulted in the lowest value in the lowest rightmost element of the augmented matrix. In some examples, the second most relevant feature may include the remaining feature from the plurality of features that is associated with the reapplication of the sweep operation that resulted in the lowest value in the lowest rightmost element of the augmented matrix. In some embodiments, the classification model may include an ordinary least squares support vector machine, a support vector machine, or a decision tree.

In one embodiment, a system for implementing the above-described method may include (1) a component-generating module, stored in memory, that generates a matrix X, a column vector Y, and a matrix Z from a training dataset that includes a plurality of samples with a plurality of features, (2) a matrix-generating module, stored in memory, that generates an augmented matrix from the matrix X, the column vector Y, and the matrix Z, (3) an identifying module, stored in memory, that identifies one or more most-relevant features from the plurality of features by iteratively applying a sweep operation to the augmented matrix, (4) a training module, stored in memory, that trains a classification model using the most-relevant features from the plurality of features rather than all of the plurality of features, and (5) at least one processor that executes the component-generating module, the matrix-generating module, the identifying module, and the training module.

In some embodiments, the training dataset may include a plurality of samples and a classification for each sample, and each sample within the training dataset may have a value for each of a plurality of features of the samples. In certain embodiments, each row of the matrix X may represent one of the plurality of samples, each column of the matrix X may represent one of the plurality of features, each row of the column vector Y may represent the classification for the one of the plurality of samples, and the matrix Z may be generated by multiplying each row of the matrix X with the classification contained in the corresponding row of the column vector Y.

In some embodiments, the matrix-generating module may generate the augmented matrix from the matrix X, the column vector Y, and the matrix Z such that (1) an upper-left matrix of the augmented matrix is equal to a product of a transpose of the column vector Y and the column vector Y, (2) an upper-middle matrix of the augmented matrix is equal to a product of the transpose of the column vector Y and the matrix Z, (3) an upper-right matrix of the augmented matrix is equal to a product of the transpose of the column vector Y and a matrix of ones, (4) a middle-left matrix of the augmented matrix is equal to a product of a transpose of the matrix Z and the column vector Y, (5) a middle matrix of the augmented matrix is equal to a sum of an identity matrix and a product of a transpose of the matrix Z and the matrix Z, (6) a middle-right matrix of the augmented matrix is equal to a product of a transpose of the matrix Z and the matrix of ones, (7) a lower-left matrix of the augmented matrix is equal to a product of a transpose of the matrix of ones and the column vector Y, (8) a lower-middle matrix of the augmented matrix is equal to a product of a transpose of the matrix of ones and the matrix Z, and (9) a lower-right matrix of the augmented matrix is equal to a number of samples in the plurality of samples.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) generate a matrix X, a column vector Y, and a matrix Z from a training dataset that includes a plurality of samples with a plurality of features, (2) generate an augmented matrix from the matrix X, the column vector Y, and the matrix Z, (3) identify one or more most-relevant features from the plurality of features by iteratively applying a sweep operation to the augmented matrix, and (4) train a classification model using the most-relevant features from the plurality of features rather than all of the plurality of features. In some embodiments, the training dataset may include a plurality of samples and a classification for each sample, and each sample within the training dataset may have a value for each of a plurality of features of the samples.

In certain embodiments, each row of the matrix X may represent one of the plurality of samples, each column of the matrix X may represent one of the plurality of features, each row of the column vector Y may represent the classification for the one of the plurality of samples, and the matrix Z may be generated by multiplying each row of the matrix X with the classification contained in the corresponding row of the column vector Y.

In some embodiments, the augmented matrix may be generated from the matrix X, the column vector Y, and the matrix Z such that (1) an upper-left matrix of the augmented matrix is equal to a product of a transpose of the column vector Y and the column vector Y, (2) an upper-middle matrix of the augmented matrix is equal to a product of the transpose of the column vector Y and the matrix Z, (3) an upper-right matrix of the augmented matrix is equal to a product of the transpose of the column vector Y and a matrix of ones, (4) a middle-left matrix of the augmented matrix is equal to a product of a transpose of the matrix Z and the column vector Y, (5) a middle matrix of the augmented matrix is equal to a sum of an identity matrix and a product of a transpose of the matrix Z and the matrix Z, (6) a middle-right matrix of the augmented matrix is equal to a product of a transpose of the matrix Z and the matrix of ones, (7) a lower-left matrix of the augmented matrix is equal to a product of a transpose of the matrix of ones and the column vector Y, (8) a lower-middle matrix of the augmented matrix is equal to a product of a transpose of the matrix of ones and the matrix Z, and (9) a lower-right matrix of the augmented matrix is equal to a number of samples in the plurality of samples.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is a diagram of an exemplary component matrix for selecting features for classification.

FIG. 8 is a diagram of an exemplary symbolic representation of an augmented matrix for selecting features for classification.

FIG. 9 is a diagram of an exemplary augmented matrix for selecting features for classification.

Figure 1:
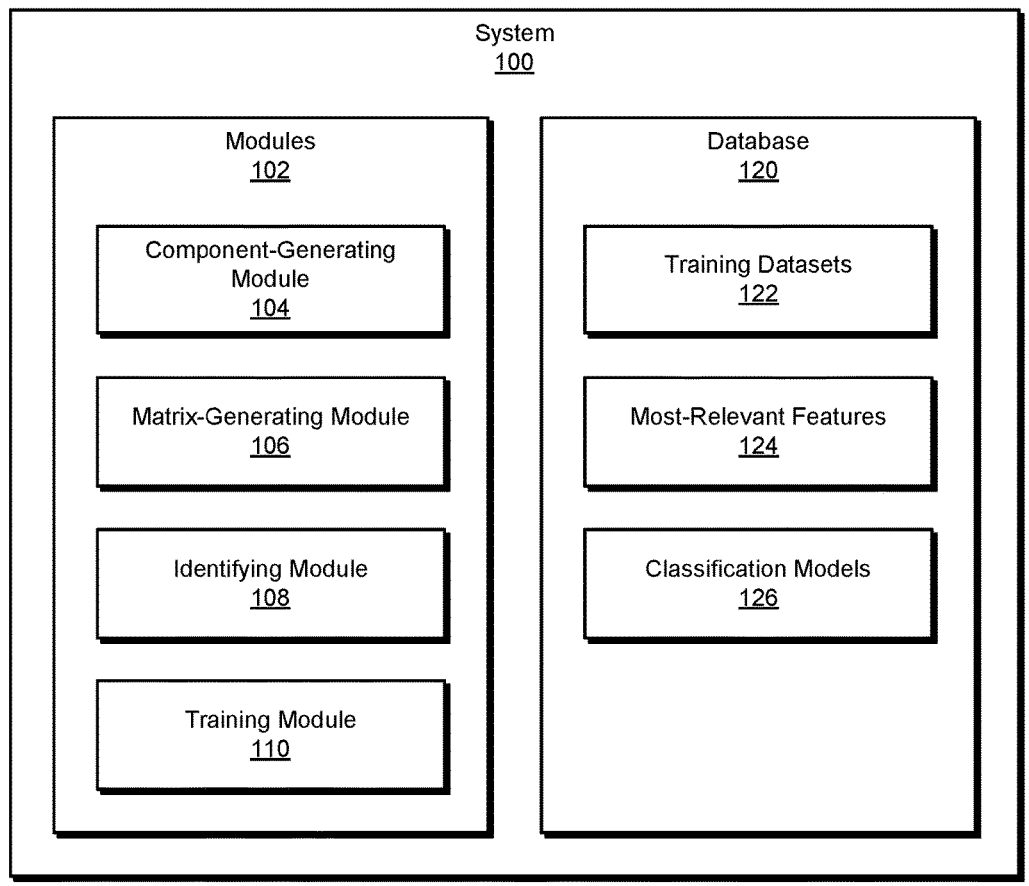
FIG. 1 is a block diagram of an exemplary system for selecting features for classification.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for selecting features for classification. As will be explained in greater detail below, by iteratively applying a sweep operation to an augmented matrix that was generated from a training dataset, the systems and methods described herein may improve the efficiency in which the significance of features of the training dataset's samples may be ranked. Moreover, by iteratively applying a sweep operation to an augmented matrix that was generated from a training dataset, the systems and methods described herein may increase the speed at which least squares support vector machines are solved and the features used to train the least squares support vector machines are ranked.

In some examples, by applying a sweep operation to an augmented matrix that was generated from a training dataset, the systems and methods described herein may be capable of (1) reusing computations that resulted from ranking more significant features of the training dataset's samples to rank the significance of less significant features and (2) using a relatively small number of computationally cheap operations to rank any one feature as compared to other feature-selection methods that may perform a relatively large number of expensive estimations of a classification model to rank any one feature. By using a relatively small number of computationally cheap operations to rank any one feature as compared to other feature-selection methods, the systems and methods described herein may select and rank features in a way that is magnitudes faster than the other feature-selection methods. Embodiments of the instant disclosure may also provide various other advantages and features, as discussed in greater detail below.

Figure 2:
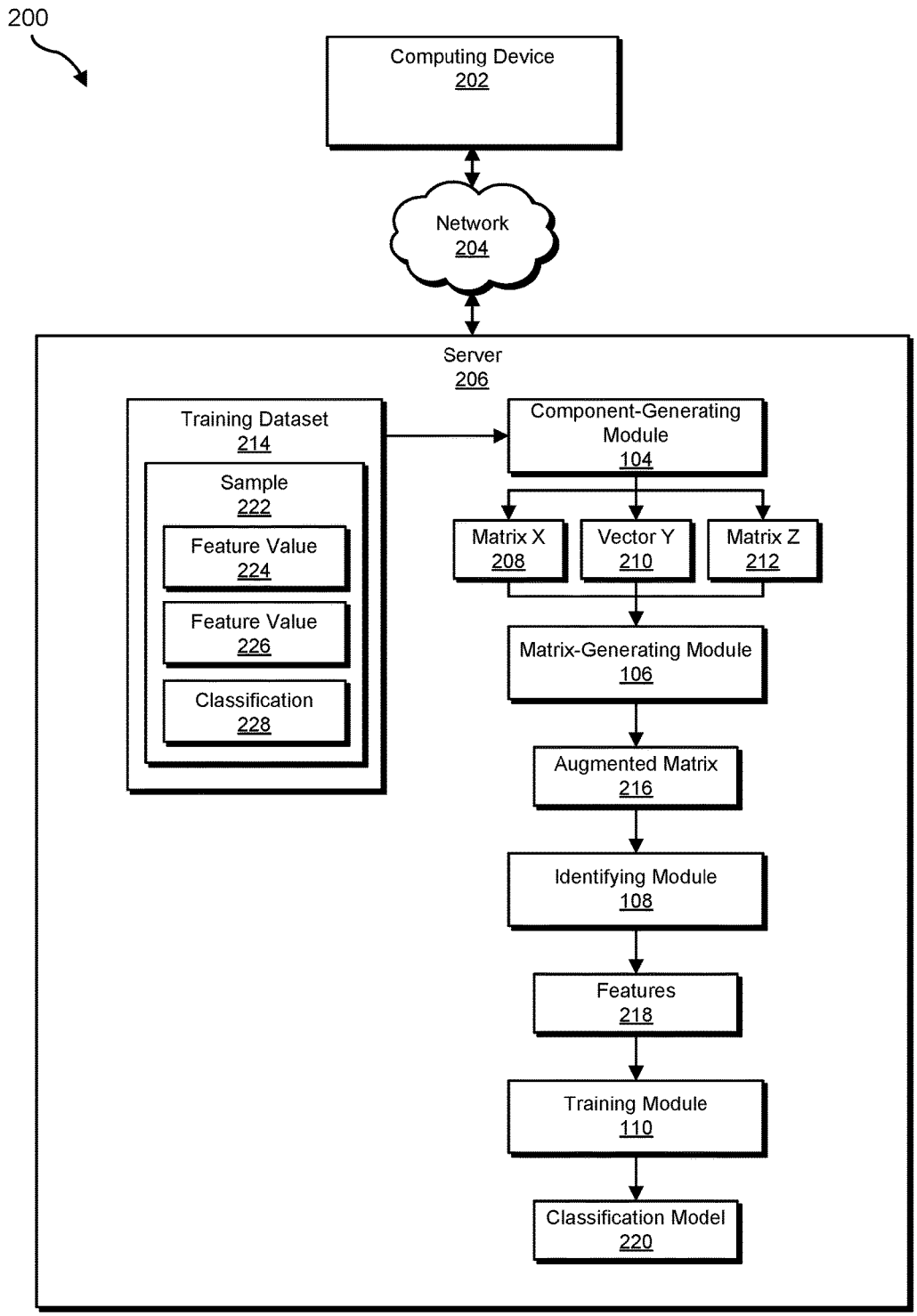
FIG. 2 is a block diagram of an additional exemplary system for selecting features for classification.

The following will provide, with reference to FIGS. 1-2, detailed descriptions of exemplary systems for selecting features for classification. Detailed descriptions of corresponding computer-implemented methods will also be provided in connection with FIGS. 3-9. In addition, detailed descriptions of an exemplary computing system and network architecture capable of implementing one or more of the embodiments described herein will be provided in connection with FIGS. 10 and 11, respectively.

FIG. 1 is a block diagram of an exemplary system 100 for selecting features for classification. As illustrated in this figure, exemplary system 100 may include one or more modules 102 for performing one or more tasks. For example, and as will be explained in greater detail below, exemplary system 100 may include a component-generating module 104 that generates a matrix X, a column vector Y, and a matrix Z from a training dataset that includes a plurality of samples with a plurality of features. Exemplary system 100 may also include a matrix-generating module 106 that generates an augmented matrix from the matrix X, the column vector Y, and the matrix Z.

In addition, and as will be described in greater detail below, exemplary system 100 may include an identifying module 108 that identifies one or more most-relevant features from the plurality of features by iteratively applying a sweep operation to the augmented matrix. Exemplary system 100 may also include a training module 110 that trains a classification model using the most-relevant features from the plurality of features rather than all of the plurality of features. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 1010 in FIG. 10, and/or portions of exemplary network architecture 1100 in FIG. 11. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include training datasets 122 for storing information about one or more training datasets, most-relevant features 124 for storing information about one or more features from training datasets 122 that have been identified as most-relevant, and classification models 126 for storing information about one or more classification models that have been trained using features from most-relevant features 124.

Database 120 may represent portions of a single database or computing device or a plurality of databases or computing devices. For example, database 120 may represent a portion of server 206 in FIG. 2, computing system 1010 in FIG. 10, and/or portions of exemplary network architecture 1100 in FIG. 11. Alternatively, database 120 in FIG. 1 may represent one or more physically separate devices capable of being accessed by a computing device, such as server 206 in FIG.

Figure 10:
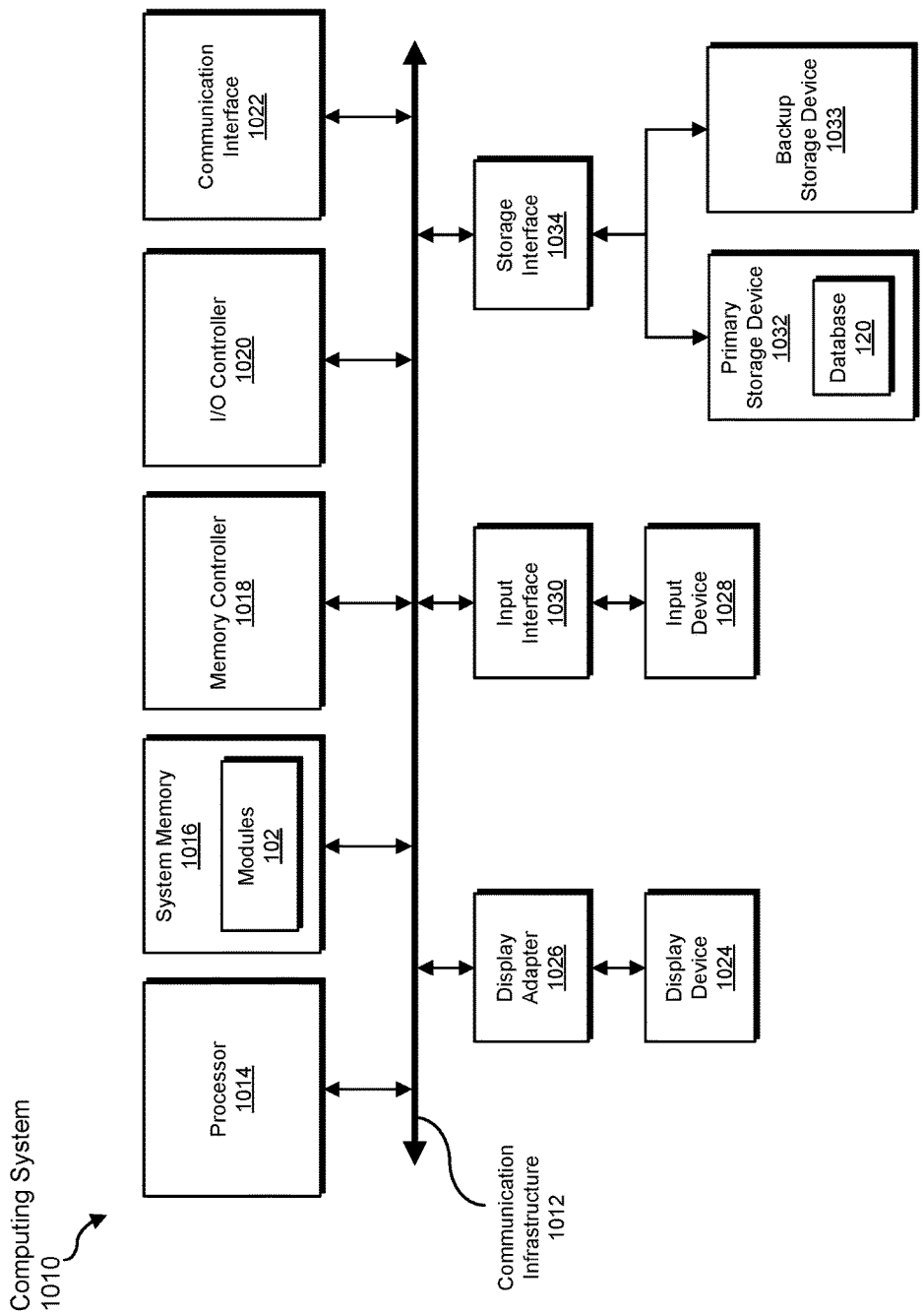
FIG. 10 is a block diagram of an exemplary computing system capable of implementing one or more of the embodiments described and/or illustrated herein.
Figure 11:
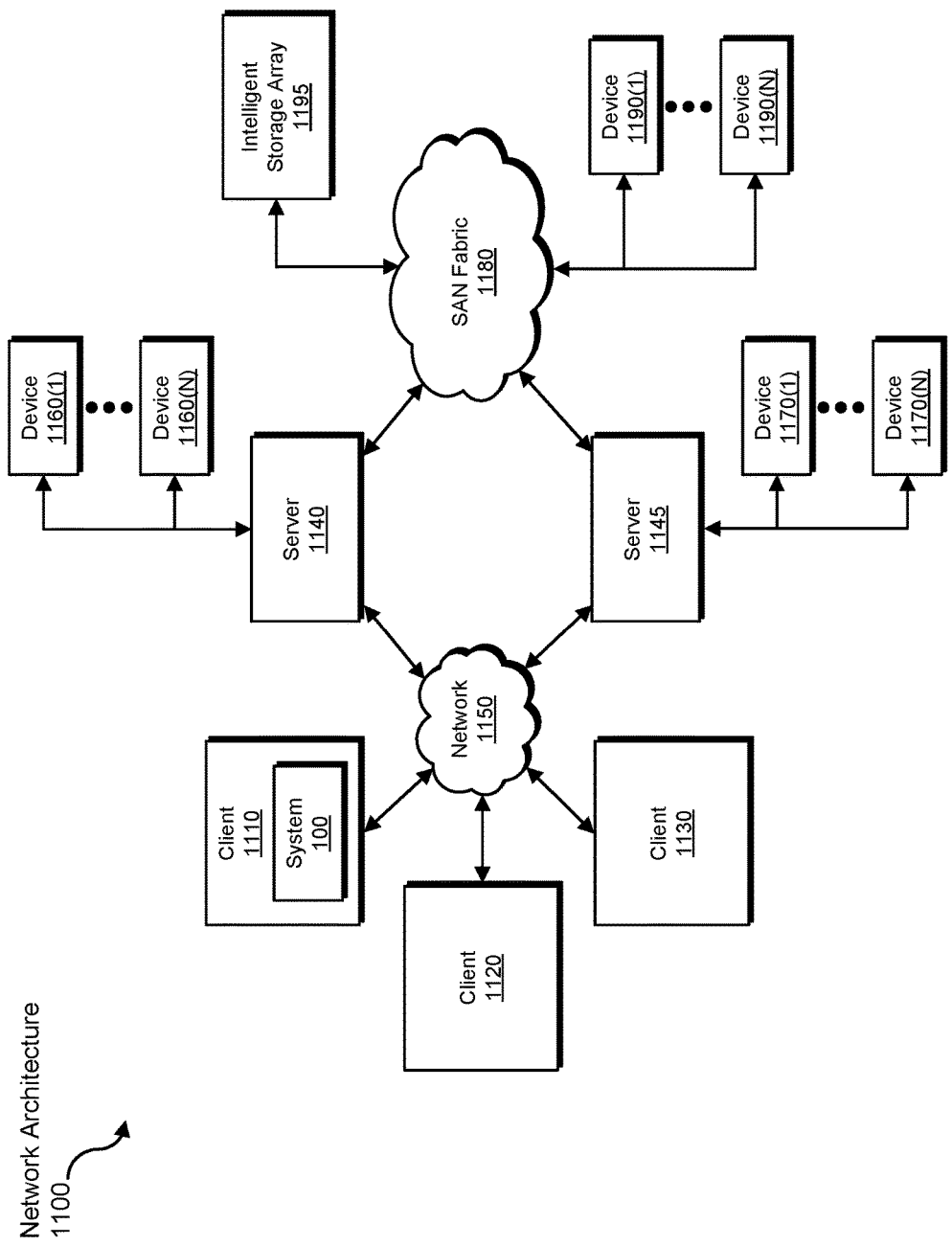
FIG. 11 is a block diagram of an exemplary computing network capable of implementing one or more of the embodiments described and/or illustrated herein.

2, computing system 1010 in FIG. 10, and/or portions of exemplary network architecture 1100 in FIG. 11.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to select features for classification. For example, and as will be described in greater detail below, one or more of modules 102 may cause computing device 202 and/or server 206 to (1) generate a matrix X 208, a column vector Y 210, and a matrix Z 212 from a training dataset 214 that includes a plurality of samples (e.g., sample 222) with a plurality of features (e.g., feature values 224 and 226 and classification 228), (2) generate an augmented matrix 216 from matrix X 208, column vector Y 210, and matrix Z 212, (3) identify most-relevant features 218 by iteratively applying a sweep operation to augmented matrix 216, and (4) train a classification model 220 using most-relevant features 218.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 1010 in FIG. 10, or any other suitable computing device.

Server 206 generally represents any type or form of computing device that is capable of reading computer-executable instructions. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1100 in FIG. 11, or the like. Network 204 may facilitate communication or data transfer using wireless or wired connections. In one embodiment, network 204 may facilitate communication between computing device 202 and server 206.

Figure 3:
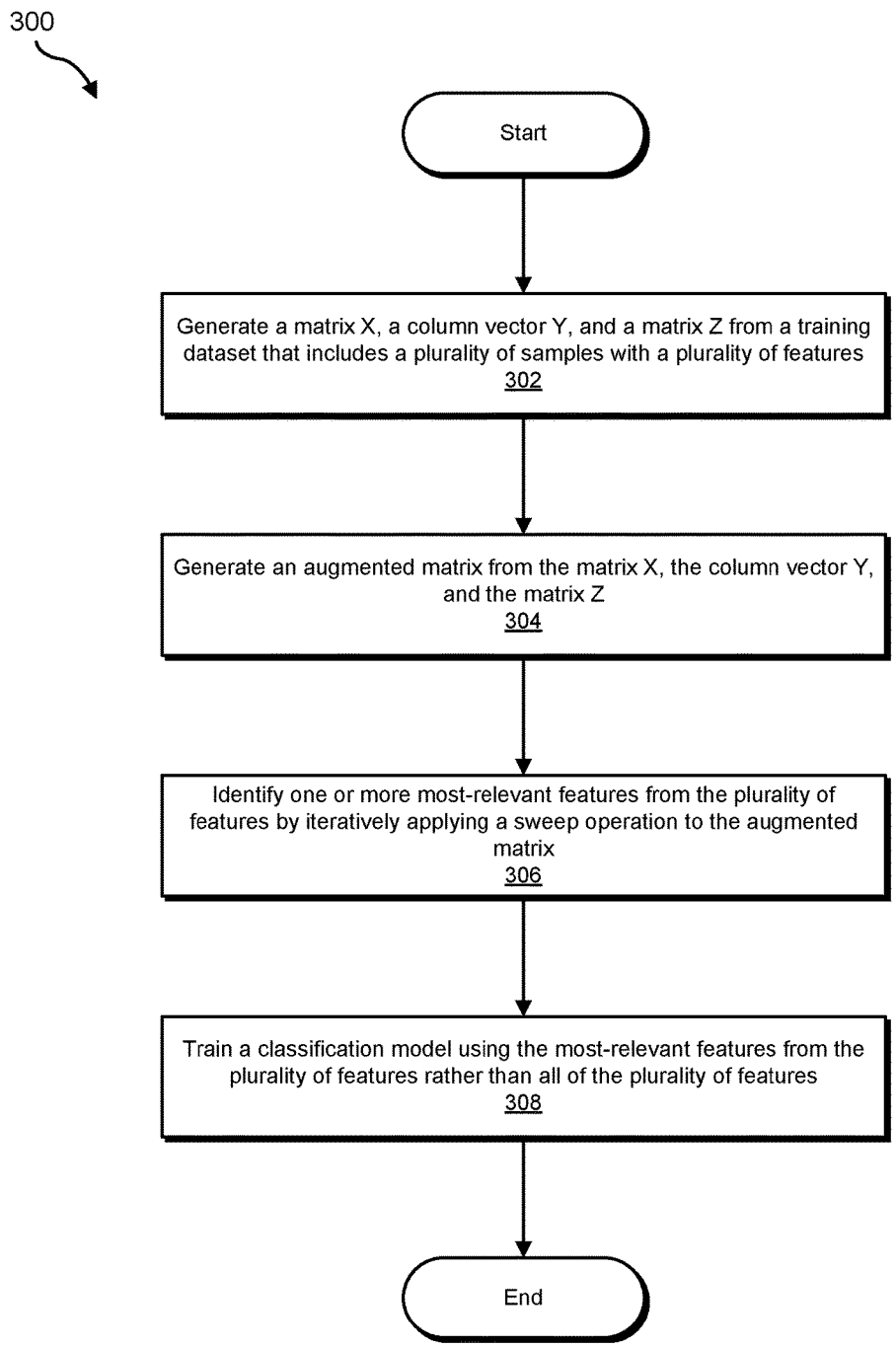
FIG. 3 is a flow diagram of an exemplary method for selecting features for classification.

FIG. 3 is a flow diagram of an exemplary computer-implemented method 300 for selecting features for classification. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 1010 in FIG. 10, and/or portions of exemplary network architecture 1100 in FIG. 11.

As illustrated in FIG. 3, at step 302 one or more of the systems described herein may generate a matrix X, a column vector Y, and a matrix Z from a training dataset that includes a plurality of samples with a plurality of features. For example, component-generating module 104 may, as part of server 206 in FIG. 2, generate matrix X 208, column vector Y 210, and matrix Z 212 from training dataset 214.

The systems described herein may perform step 302 in any suitable manner. For example, component-generating module 104 may generate a matrix X, a column vector Y, and a matrix Z from a training dataset by organizing portions of the training dataset into the matrix X, the column vector Y, and the matrix Z. As used herein, the term "training dataset" generally refers to any data, statistics, and/or other information that is known about the features and classifications of one or more previously classified samples or examples that may be used to train a classification model to predict classifications of new observances. For example, a training dataset that may be used to train a classification model to predict whether a newly encountered application is malicious or benign may include information about previously seen applications that are known to be malicious as well as information about previously seen applications that are known to be benign.

The term "feature," as used herein, generally refers to any characteristic or factor of a sample that may be used to represent the sample and that may be correlated with a classification of the sample. The samples in a training dataset may be represented using any number of features, and each sample in the training dataset may have a particular value (e.g., a binary or numerical value) for each of the features. The term "classification," as used herein, generally refers to any indicator of the membership of a sample in one of two or more groups or categories. The samples in a training dataset may have been assigned one of two or more classifications, and each sample in the training dataset may be associated with a particular value (e.g., a binary value) that indicates the classification to which the sample has been assigned.

Figure 4:
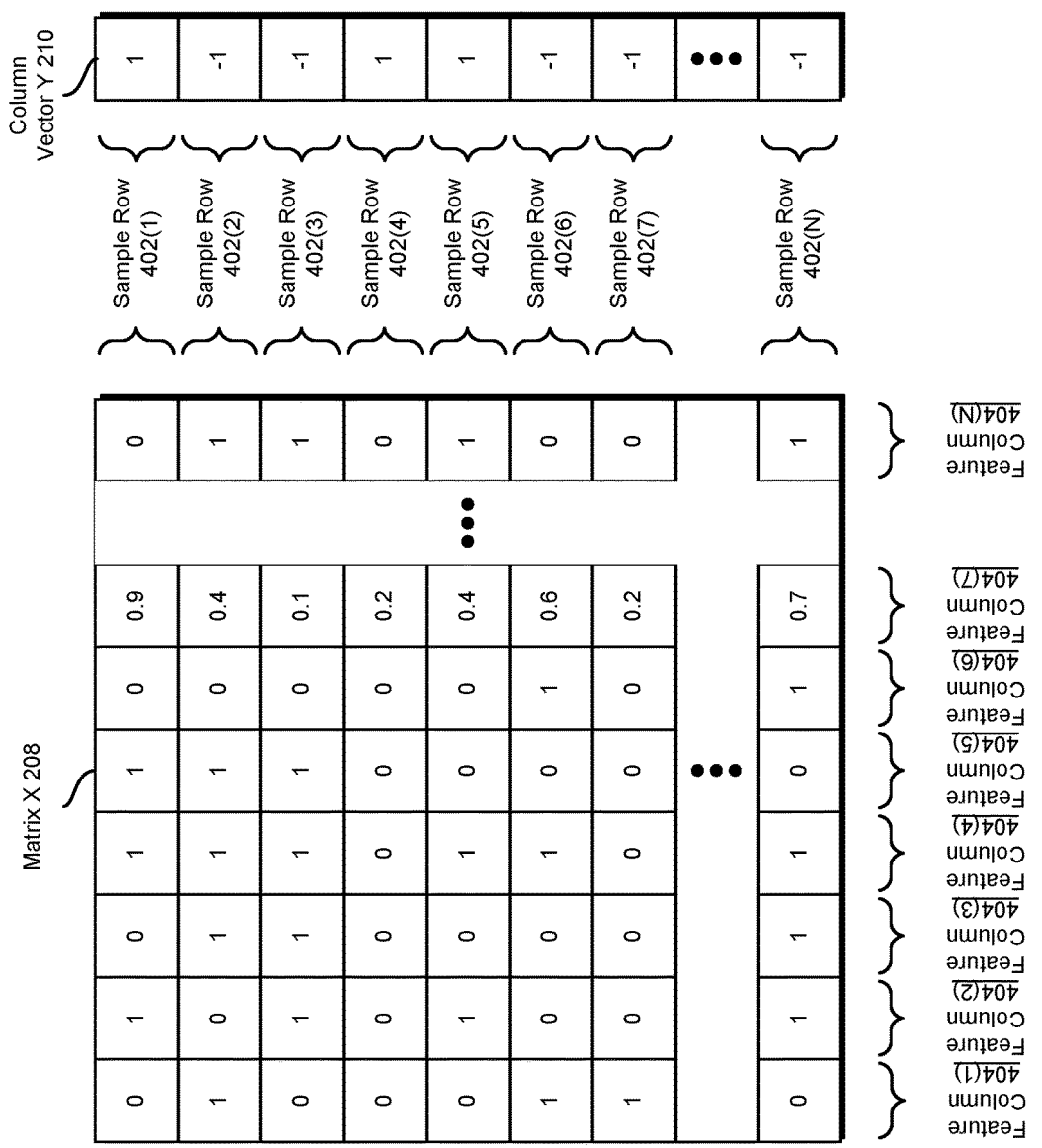
FIG. 4 is a diagram of exemplary component matrices for selecting features for classification.

As used herein, the term "matrix X" may refer to any matrix-based representation of the samples in a training dataset and their features. In general, each row of a matrix X may represent one of the samples in the training dataset, each column of the matrix X may represent one of the samples' features, and each element of the matrix may represent the value of a particular feature of a single sample. FIG. 4 illustrates an exemplary matrix X 208. In this example, each of sample rows 402(1)-(N) represents a single sample from training dataset 214, each of feature columns 404(1)-(N) represents a single feature of the samples in training dataset 214, and each element of matrix X 208 represents the value of a single feature of a single sample. Generally, component-generating module 104 may generate a matrix X from a training dataset by first identifying each sample in the training dataset and, for each identified sample, a value for each of its features. Component-generating module 104 may then represent each identified sample and its features as a row in the matrix X. Component-generating module 104 may generate a matrix X such that the number of rows in the matrix X are equal to the number of samples in the training dataset and the number of columns of the matrix X are equal to the number of features of the samples.

As used herein, the term "column vector Y" may refer to any matrix-based representation of the samples in a training dataset and their classifications. In general, a column vector Y may be a column vector, each row of the column vector Y may represent one of the samples in the training dataset, and each element of the column vector Y may represent a value that indicates a particular classification of a single sample. FIG. 4 illustrates an exemplary column vector Y 210. In this example, each of sample rows 404(1)-(N) represents a single sample from training dataset 214, and each element of column vector Y 210 represents a value that indicates a particular classification of a single sample. Generally, component-generating module 104 may generate a column vector Y from a training dataset by first identifying each sample in the training dataset and, for each identified sample, a value that indicates its classification. Component-generating module 104 may then represent each identified sample and its classification as a row in the column vector Y. Component-generating module 104 may generate a column vector Y such that the number of rows in the column vector Y are equal to the number of samples in the training dataset. Component-generating module 104 may also generate a matrix X and a column vector Y such that $row_i$ in the matrix X and $row_i$ in the column vector Y represent the same sample.

Figure 5:
FIG. 5 is a diagram of an exemplary symbolic representation of a component matrix for selecting features for classification.
Figure 6:
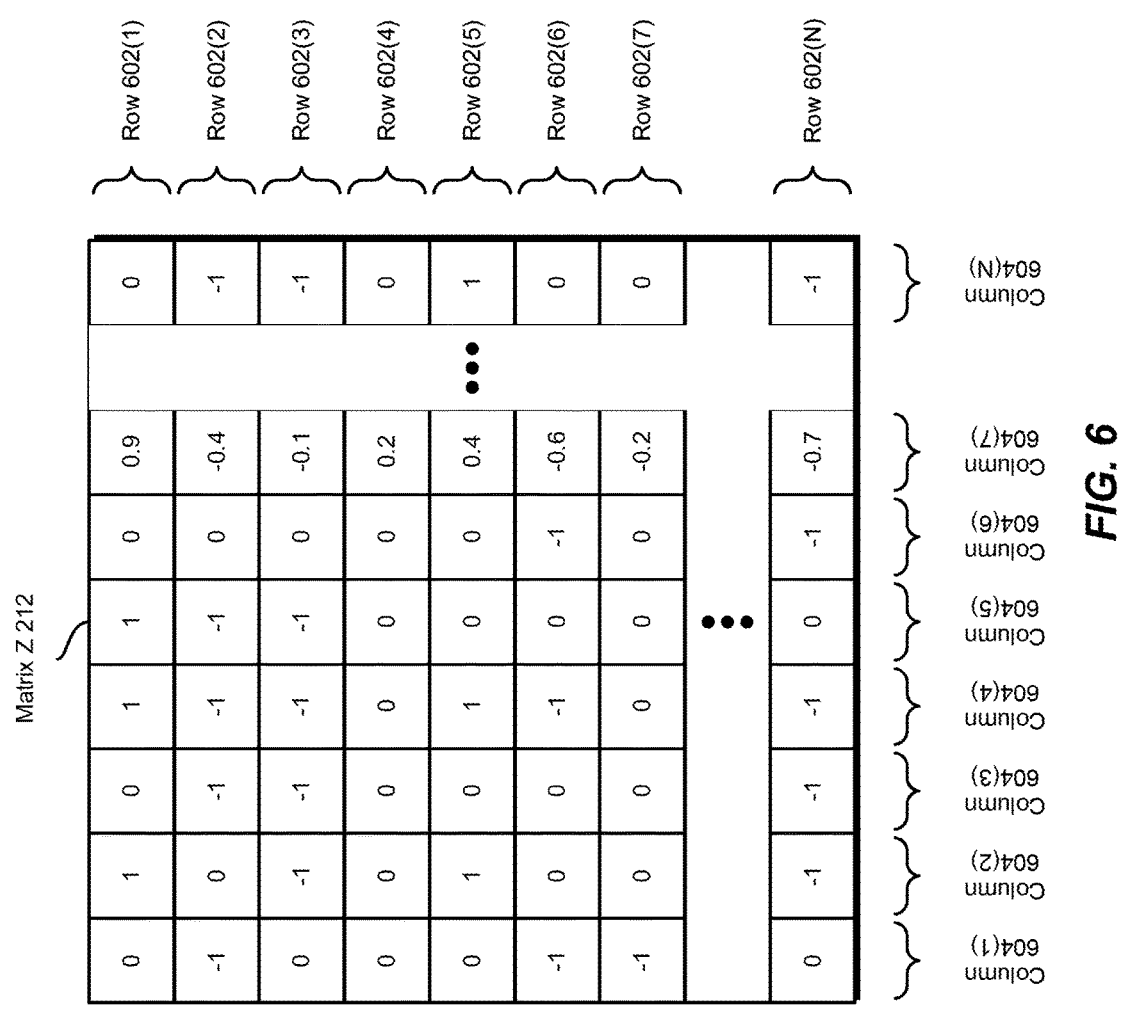

As used herein, the term "matrix Z" may refer to any matrix derived from a matrix X and a column vector Y by multiplying each row of the matrix X with the classification value contained in the corresponding row of the column vector Y. FIG. 5 illustrates a symbolic representation of matrix Z 212 where $X_i$ is the i row of a matrix X and $y_i$ is the classification value at the i row of a column vector Y. FIG. 6 illustrates an exemplary matrix Z 212 derived from matrix X 208 and column vector Y 210 in FIG. 4. Generally, component-generating module 104 may generate a matrix Z from a training dataset by multiplying each row of a matrix X with the classification value contained in the corresponding row of a column vector Y. Using FIGS. 4 and 6 as an example, component-generating module 104 may generate matrix Z 212, as shown in FIG. 6 with rows 602(1)-(N) and columns 604(1)-(N), from matrix X 208 and column vector Y 210 as shown in FIG. 4 by multiplying each row of matrix X 208 with the classification value contained in the corresponding row of column vector Y 210. For example, component-generating module 104 may generate row 602(N) of matrix Z 212 by multiplying sample row 402(N) of matrix X 208 with the classification value contained in sample row 402(N) of column vector Y 210.

At step 304, one or more of the systems described herein may generate an augmented matrix from the matrix X, the column vector Y, and the matrix Z. For example, matrix-generating module 106 may, as part of server 206 in FIG. 2, generate an augmented matrix 216 from matrix X 208, column vector Y 210, and matrix Z 212.

Figure 7:
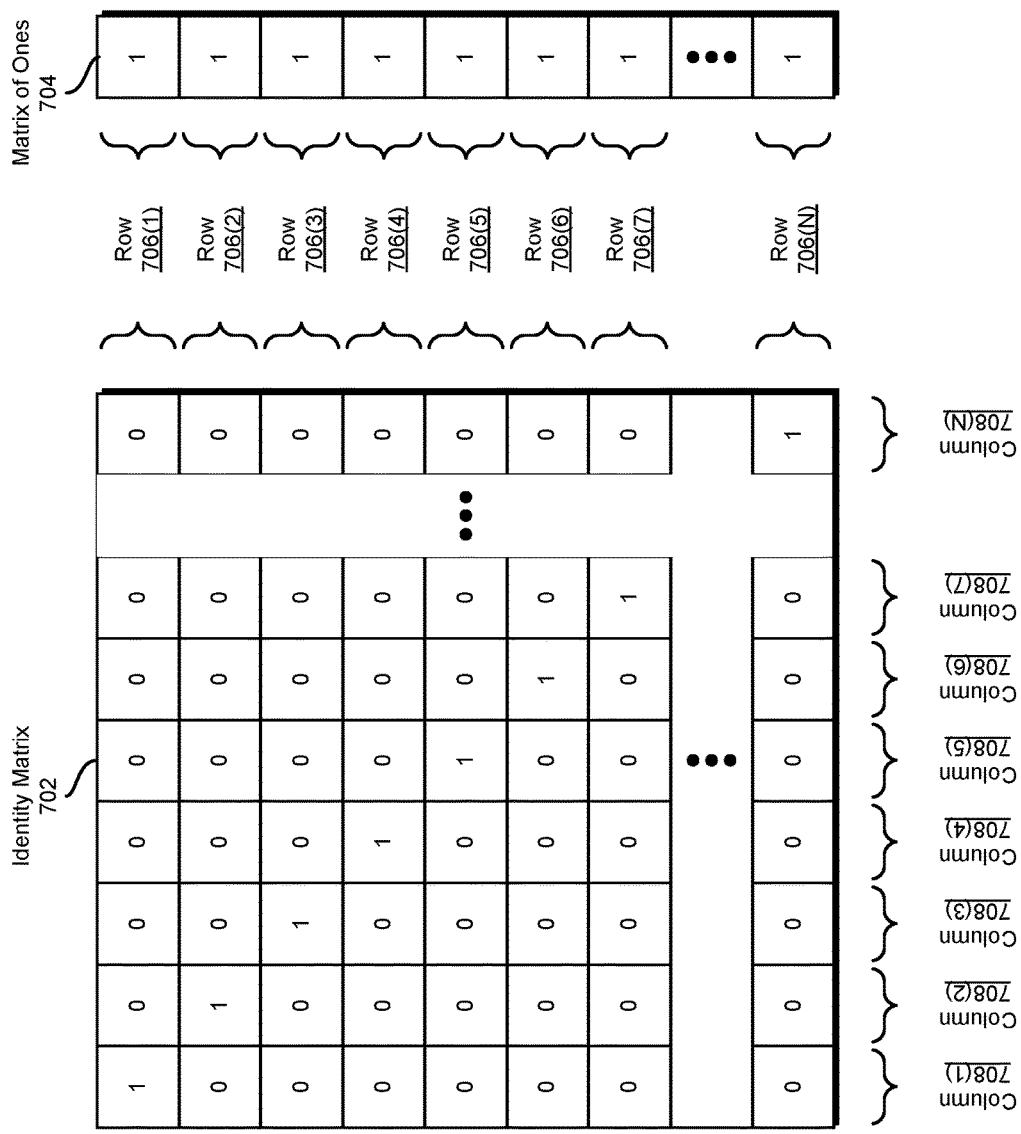
FIG. 7 is a diagram of exemplary component matrices for selecting features for classification.

Generally, matrix-generating module 106 may generate an augmented matrix by calculating and combining its component matrices. As used herein, the term "augmented matrix" generally refers to a matrix that is constructed from other component matrices and specifically refers to a matrix whose upper left portion is equal to a matrix that is a product of a transpose of a column vector Y and the column vector Y, whose upper middle portion is equal to a matrix that is a product of the transpose of the column vector Y and a matrix Z, whose upper right portion is equal to a matrix that is a product of the transpose of the column vector Y and a matrix of ones (e.g., matrix of ones 704 as shown in FIG. 7 with rows 706(1)-(N) and columns 708(1)-(N)), whose middle left portion is equal to a matrix that is a product of a transpose of the matrix Z and the column vector Y, whose middle portion is equal to a matrix that is a sum of an identity matrix (e.g., identity matrix 702 in FIG. 7) and a product of a transpose of the matrix Z and the matrix Z, whose middle right portion is equal to a matrix that is a product of a transpose of the matrix Z and the matrix of ones, whose lower left portion is equal to a matrix that is a product of a transpose of the matrix of ones and the column vector Y, whose lower middle portion is equal to a matrix that is a product of a transpose of the matrix of ones and the matrix Z, and whose lower right portion is equal to a the number of samples represented in the matrix X and the column vector Y.

When constructed as described above, the middle component matrix of an augmented matrix may have a number of rows and a number of columns that are equal to the number of features represented in the matrix X, and the augmented matrix may have a number of rows and a number of columns that are equal to two more than the number of features represented in the matrix X. In addition when constructed as described above, the diagonal element $a_{ii}$, the $row_i$, and the $column_i$ of the middle component matrix of an augmented matrix may be tied to or associated with the feature $column_i$ in the matrix X such that the performance of a sweep operation on the diagonal element $a_{ii}$, the $row_i$, and/or the $column_i$ may provide information about (e.g., the relevancy of) the feature represented by the feature $column_i$ in the matrix X.

FIG. 8 illustrates a symbolic representation of augmented matrix 216 where the term X represents a matrix X, the term Y represents a column vector Y, the term Z represents a matrix Z, the term I represents an identity matrix, and the term 1 represents a column vector of ones. FIG. 9 illustrates the various component matrices of augmented matrix 216. As shown in FIG. 9, augmented matrix 216 may include (1) an upper-left matrix 902, (2) an upper-middle matrix 904, (3) an upper-right matrix 906, (4) a middle-left matrix 912, (5) a middle matrix 914, (6) a middle-right matrix 916, (7) a lower-left matrix 922, (8) a lower-middle matrix 924, and (9) a lower-right matrix 926.

At step 306, one or more of the systems described herein may identify one or more most-relevant features from the plurality of features by iteratively applying a sweep operation to the augmented matrix. For example, identifying module 108 may, as part of server 206 in FIG. 2, identify most-relevant features 218 by iteratively applying a sweep operation to augmented matrix 216.

As used herein, the term "most-relevant features" generally refers to the features of the samples in a training dataset that most affect classifications of the samples and/or that are most correlated with classifications of the samples. Additionally or alternatively, the term "most-relevant features" may refer to a combination of features of the samples in a training dataset that, when used to train a classification model, results in a classification model with the lowest error rate (e.g., the lowest mean squared error or residual error) as compared with classification models trained using other combination of the features.

As used herein, the term "sweep operation" generally refers to a pivot of a diagonal element $a_{kk}$ of a matrix according to the following steps (or their equivalents):

Step 1: Let $D=a_{kk}$
Step 2: Divide $row_k$ by D
Step 3: For every other $row_i$ where i≠k, let $B=a_{ik}$.
Subtract B x $row_k$ from $row_i$.
Set $a_{ik}=-B/D$
Step 4: Set $a_{kk}=1/D$ As indicated above, the diagonal element $a_{ii}$ of the middle component matrix of an augmented matrix may be tied to or associated with the feature represented by feature $column_i$ in a matrix X. If the sweep operation described above is performed recursively on each diagonal element of an augmented matrix except for the lowest rightmost diagonal element, the lowest rightmost diagonal element of the augmented matrix may contain an estimation of an error rate of a classification model that is trained using all of the features represented in the augmented matrix. In addition if the sweep operation is performed on a single diagonal element of an augmented matrix, the lowest rightmost diagonal element of the augmented matrix may contain an estimation of an error rate of a classification model that is trained using the feature associated with the diagonal element along with any features associated with diagonal elements of the augmented matrix on which the sweep operation was already performed. As such, iterations of the sweep operation may be used to determine the relevancy of each feature of the samples in a training dataset by indicating how the feature may affect the error rate of a classification model that is trained using the feature. More specifically, the performance of a sweep operation on the diagonal element $a_{kk}$ of the augmented matrix may indicate how the feature represented by the feature column$_{k-1}$ in the matrix X may affect the error rate of a classification model that is trained using the feature.

In some examples, identifying module 108 may generate an initial state of an augmented matrix to prepare to identify the most-relevant features from the features represented in the augmented matrix by applying the above described sweep operation on the first diagonal element $a_{11}$ of the augmented matrix. Identifying module 108 may then identify the most relevant feature from the features represented in the augmented matrix by first applying the sweep operation to each remaining diagonal element of the initial state of the augmented matrix. By applying the sweep operation to a remaining diagonal element of the initial state of the augmented matrix, identifying module 108 may cause the lowest rightmost diagonal element of the augmented matrix to contain an estimation of an error rate of a classification model that is trained using only the feature associated with the remaining diagonal element. For this reason, identifying module 108 may identify the most relevant feature from the features represented in the augmented matrix by identifying the feature associated with the diagonal element on which application of the sweep operation resulted in the lowest value in the lowest rightmost element of the augmented matrix. For example, if identifying module 108 determines that an application of the sweep operation to diagonal element $a_{kk}$ resulted in the lowest value in the lowest rightmost element of the augmented matrix, identifying module 108 may rank the feature represented by column$_{k-1}$ in the matrix X as the most relevant feature among the features represented in the matrix X. Upon identifying the most relevant feature, identifying module 108 may generate a second state of the augmented matrix by applying the sweep operation to diagonal element $a_{kk}$ of the initial state of the augmented matrix.

Next, identifying module 108 may identify the second most relevant feature from the plurality of features by first applying the sweep operation to each remaining diagonal element of the second state of the augmented matrix. By applying the sweep operation to a remaining diagonal element of the second state of the augmented matrix, identifying module 108 may cause the lowest rightmost diagonal element of the augmented matrix to contain an estimation of an error rate of a classification model that is trained using the feature associated with the remaining diagonal element and the most relevant feature. For this reason, identifying module 108 may identify the second most relevant feature from the features represented in the augmented matrix by identifying the feature associated with the diagonal element on which application of the sweep operation resulted in the lowest value in the lowest rightmost element of the augmented matrix. For example, if identifying module 108 determines that an application of the sweep operation to diagonal element $a_{jj}$ resulted in the lowest value in the lowest rightmost element of the augmented matrix, identifying module 108 may rank the feature represented by column$_{j-1}$ in the matrix X as the most relevant feature among the features represented in the matrix X. Upon identifying the most relevant feature, identifying module 108 may generate a third state of the augmented matrix by applying the sweep operation to diagonal element $a_{jj}$ of the second state of the augmented matrix. Identifying module 108 may continue to rank any number of additional features by continuing to recursively perform the sweep operation as described above.

At step 308, one or more of the systems described herein may train a classification model using the most-relevant features from the plurality of features rather than all of the plurality of features. For example, training module 110 may, as part of server 206 in FIG. 2, train a classification model 220 using most-relevant features 218.

The systems described herein may perform step 308 in any suitable manner. For example, training module 110 may use the most-relevant features of a training dataset to train an ordinary least squares support vector machine, a support vector machine, a decision tree, or any other suitable classification model. While the above mentioned methods for selecting and ranking features may have been derived to select and rank features for training least squares support vector machines, features selected and/or ranked by these methods may also be used to train other types of classification models and may improve the performance of these other classification models as compared to features selected and/or ranked by the methods typically used to select and/or rank features for training these other classification models.

In some examples, a training dataset may include information about applications, websites, or webpages that are known to be either malicious or benign. In these examples, training module 110 may use the most-relevant features of the training dataset to train a classification model to distinguish entities that are malicious from entities that are benign. In other examples, a training dataset may include information about computing devices that are known to be infected or clean. In these examples, training module 110 may use the most-relevant features of the training dataset to train a classification model to distinguish computing devices that are infected from entities that are clean. Upon completion of step 308, exemplary method 300 in FIG. 3 may terminate.

As explained above, by iteratively applying a sweep operation to an augmented matrix that was generated from a training dataset, the systems and methods described herein may improve the efficiency in which the significance of features of the training dataset's samples may be ranked. Furthermore, in some examples, by applying a sweep operation to an augmented matrix that was generated from a training dataset, the systems and methods described herein may be capable of (1) reusing computations that resulted from ranking more significant features of the training dataset's samples to rank the significance of less significant features and (2) using a relatively small number of computationally cheap operations to rank any one feature as compared to other feature-selection methods that may perform a relatively large number of expensive estimations of a classification model to rank any one feature.

FIG. 10 is a block diagram of an exemplary computing system 1010 capable of implementing one or more of the embodiments described and/or illustrated herein. For example, all or a portion of computing system 1010 may perform and/or be a means for performing, either alone or in combination with other elements, one or more of the steps described herein (such as one or more of the steps illustrated in FIG. 3). All or a portion of computing system 1010 may also perform and/or be a means for performing any other steps, methods, or processes described and/or illustrated herein.

Computing system 1010 broadly represents any single or multi-processor computing device or system capable of executing computer-readable instructions. Examples of computing system 1010 include, without limitation, workstations, laptops, client-side terminals, servers, distributed computing systems, handheld devices, or any other computing system or device. In its most basic configuration, computing system 1010 may include at least one processor 1014 and a system memory 1016.

Processor 1014 generally represents any type or form of physical processing unit (e.g., a hardware-implemented central processing unit) capable of processing data or interpreting and executing instructions. In certain embodiments, processor 1014 may receive instructions from a software application or module. These instructions may cause processor 1014 to perform the functions of one or more of the exemplary embodiments described and/or illustrated herein.

System memory 1016 generally represents any type or form of volatile or non-volatile storage device or medium capable of storing data and/or other computer-readable instructions. Examples of system memory 1016 include, without limitation, Random Access Memory (RAM), Read Only Memory (ROM), flash memory, or any other suitable memory device. Although not required, in certain embodiments computing system 1010 may include both a volatile memory unit (such as, for example, system memory 1016) and a non-volatile storage device (such as, for example, primary storage device 1032, as described in detail below). In one example, one or more of modules 102 from FIG. 1 may be loaded into system memory 1016.

In certain embodiments, exemplary computing system 1010 may also include one or more components or elements in addition to processor 1014 and system memory 1016. For example, as illustrated in FIG. 10, computing system 1010 may include a memory controller 1018, an Input/Output (I/O) controller 1020, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an Industry Standard Architecture (ISA), Peripheral Component Interconnect (PCI), PCI Express (PCIe), or similar bus) and a network.

Memory controller 1018 generally represents any type or form of device capable of handling memory or data or controlling communication between one or more components of computing system 1010. For example, in certain embodiments memory controller 1018 may control communication between processor 1014, system memory 1016, and I/O controller 1020 via communication infrastructure 1012.

I/O controller 1020 generally represents any type or form of module capable of coordinating and/or controlling the input and output functions of a computing device. For example, in certain embodiments I/O controller 1020 may control or facilitate transfer of data between one or more elements of computing system 1010, such as processor 1014, system memory 1016, communication interface 1022, display adapter 1026, input interface 1030, and storage interface 1034.

Communication interface 1022 broadly represents any type or form of communication device or adapter capable of facilitating communication between exemplary computing system 1010 and one or more additional devices. For example, in certain embodiments communication interface 1022 may facilitate communication between computing system 1010 and a private or public network including additional computing systems. Examples of communication interface 1022 include, without limitation, a wired network interface (such as a network interface card), a wireless network interface (such as a wireless network interface card), a modem, and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1022 may also represent a host adapter configured to facilitate communication between computing system 1010 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1022 may also allow computing system 1010 to engage in distributed or remote computing. For example, communication interface 1022 may receive instructions from a remote device or send instructions to a remote device for execution.

As illustrated in FIG. 10, computing system 1010 may also include at least one display device 1024 coupled to communication infrastructure 1012 via a display adapter 1026. Display device 1024 generally represents any type or form of device capable of visually displaying information forwarded by display adapter 1026. Similarly, display adapter 1026 generally represents any type or form of device configured to forward graphics, text, and other data from communication infrastructure 1012 (or from a frame buffer, as known in the art) for display on display device 1024.

As illustrated in FIG. 10, exemplary computing system 1010 may also include at least one input device 1028 coupled to communication infrastructure 1012 via an input interface 1030. Input device 1028 generally represents any type or form of input device capable of providing input, either computer or human generated, to exemplary computing system 1010. Examples of input device 1028 include, without limitation, a keyboard, a pointing device, a speech recognition device, or any other input device.

As illustrated in FIG. 10, exemplary computing system 1010 may also include a primary storage device 1032 and a backup storage device 1033 coupled to communication infrastructure 1012 via a storage interface 1034. Storage devices 1032 and 1033 generally represent any type or form of storage device or medium capable of storing data and/or other computer-readable instructions. For example, storage devices 1032 and 1033 may be a magnetic disk drive (e.g., a so-called hard drive), a solid state drive, a floppy disk drive, a magnetic tape drive, an optical disk drive, a flash drive, or the like. Storage interface 1034 generally represents any type or form of interface or device for transferring data between storage devices 1032 and 1033 and other components of computing system 1010. In one example, database 120 from FIG. 1 may be stored in primary storage device 1032.

In certain embodiments, storage devices 1032 and 1033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1033 may also include other similar structures or devices for allowing computer software, data, or other computer-readable instructions to be loaded into computing system 1010. For example, storage devices 1032 and 1033 may be configured to read and write software, data, or other computer-readable information. Storage devices 1032 and 1033 may also be a part of computing system 1010 or may be a separate device accessed through other interface systems.

Many other devices or subsystems may be connected to computing system 1010. Conversely, all of the components and devices illustrated in FIG. 10 need not be present to practice the embodiments described and/or illustrated herein. The devices and subsystems referenced above may also be interconnected in different ways from that shown in FIG. 10. Computing system 1010 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1010. All or a portion of the computer program stored on the computer-readable medium may then be stored in system memory 1016 and/or various portions of storage devices 1032 and 1033. When executed by processor 1014, a computer program loaded into computing system 1010 may cause processor 1014 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1010 may be configured as an Application Specific Integrated Circuit (ASIC) adapted to implement one or more of the exemplary embodiments disclosed herein.

FIG. 11 is a block diagram of an exemplary network architecture 1100 in which client systems 1110, 1120, and 1130 and servers 1140 and 1145 may be coupled to a network 1150. As detailed above, all or a portion of network architecture 1100 may perform and/or be a means for performing, either alone or in combination with other elements, one or more of the steps disclosed herein (such as one or more of the steps illustrated in FIG. 3). All or a portion of network architecture 1100 may also be used to perform and/or be a means for performing other steps and features set forth in the instant disclosure.

Client systems 1110, 1120, and 1130 generally represent any type or form of computing device or system, such as exemplary computing system 1010 in FIG. 10. Similarly, servers 1140 and 1145 generally represent computing devices or systems, such as application servers or database servers, configured to provide various database services and/or run certain software applications. Network 1150 generally represents any telecommunication or computer network including, for example, an intranet, a WAN, a LAN, a PAN, or the Internet. In one example, client systems 1110, 1120, and/or 1130 and/or servers 1140 and/or 1145 may include all or a portion of system 100 from FIG. 1.

As illustrated in FIG. 11, one or more storage devices 1160(1)-(N) may be directly attached to server 1140. Similarly, one or more storage devices 1170(1)-(N) may be directly attached to server 1145. Storage devices 1160(1)-(N) and storage devices 1170(1)-(N) generally represent any type or form of storage device or medium capable of storing data and/or other computer-readable instructions. In certain embodiments, storage devices 1160(1)-(N) and storage devices 1170(1)-(N) may represent Network-Attached Storage (NAS) devices configured to communicate with servers 1140 and 1145 using various protocols, such as Network File System (NFS), Server Message Block (SMB), or Common Internet File System (CIFS).

Servers 1140 and 1145 may also be connected to a Storage Area Network (SAN) fabric 1180. SAN fabric 1180 generally represents any type or form of computer network or architecture capable of facilitating communication between a plurality of storage devices. SAN fabric 1180 may facilitate communication between servers 1140 and 1145 and a plurality of storage devices 1190(1)-(N) and/or an intelligent storage array 1195. SAN fabric 1180 may also facilitate, via network 1150 and servers 1140 and 1145, communication between client systems 1110, 1120, and 1130 and storage devices 1190(1)-(N) and/or intelligent storage array 1195 in such a manner that devices 1190(1)-(N) and array 1195 appear as locally attached devices to client systems 1110, 1120, and 1130. As with storage devices 1160(1)-(N) and storage devices 1170(1)-(N), storage devices 1190(1)-(N) and intelligent storage array 1195 generally represent any type or form of storage device or medium capable of storing data and/or other computer-readable instructions.

In certain embodiments, and with reference to exemplary computing system 1010 of FIG. 10, a communication interface, such as communication interface 1022 in FIG. 10, may be used to provide connectivity between each client system 1110, 1120, and 1130 and network 1150. Client systems 1110, 1120, and 1130 may be able to access information on server 1140 or 1145 using, for example, a web browser or other client software. Such software may allow client systems 1110, 1120, and 1130 to access data hosted by server 1140, server 1145, storage devices 1160(1)-(N), storage devices 1170(1)-(N), storage devices 1190(1)-(N), or intelligent storage array 1195. Although FIG. 11 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1140, server 1145, storage devices 1160(1)-(N), storage devices 1170(1)-(N), storage devices 1190(1)-(N), intelligent storage array 1195, or any combination thereof. All or a portion of one or more of the exemplary embodiments disclosed herein may also be encoded as a computer program, stored in server 1140, run by server 1145, and distributed to client systems 1110, 1120, and 1130 over network 1150.

As detailed above, computing system 1010 and/or one or more components of network architecture 1100 may perform and/or be a means for performing, either alone or in combination with other elements, one or more steps of an exemplary method for selecting features for classification.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a training dataset to be transformed, transform the training dataset into an augmented matrix that may be used to perform feature selection, output a result of the transformation to a system that uses the augmented matrix to identify the most-relevant features from the training dataset, use the result of the transformation to identify the most-relevant features from the training dataset, and/or store the result of the transformation to an augmented-matrix storage system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for selecting features for classification, at least a portion of the method being performed by a computing device comprising at least one processor, the method comprising:
generating a matrix X, a column vector Y, and a matrix Z from a training dataset, wherein:
the training dataset comprises:
a plurality of samples;
a classification for each sample;
each sample within the training dataset has a value for each of a plurality of features of the samples;
each row of the matrix X represents one of the plurality of samples;
each column of the matrix X represents one of the plurality of features;
each row of the column vector Y represents the classification for the one of the plurality of samples;
the matrix Z is generated by multiplying each row of the matrix X with the classification contained in the corresponding row of the column vector Y;
generating an augmented matrix from the matrix X, the column vector Y, and the matrix Z such that:
an upper-left matrix of the augmented matrix is equal to a product of a transpose of the column vector Y and the column vector Y;
an upper-middle matrix of the augmented matrix is equal to a product of the transpose of the column vector Y and the matrix Z;
an upper-right matrix of the augmented matrix is equal to a product of the transpose of the column vector Y and a matrix of ones;
a middle-left matrix of the augmented matrix is equal to a product of a transpose of the matrix Z and the column vector Y;
a middle matrix of the augmented matrix is equal to a sum of an identity matrix and a product of a transpose of the matrix Z and the matrix Z;
a middle-right matrix of the augmented matrix is equal to a product of a transpose of the matrix Z and the matrix of ones;
a lower-left matrix of the augmented matrix is equal to a product of a transpose of the matrix of ones and the column vector Y;
a lower-middle matrix of the augmented matrix is equal to a product of a transpose of the matrix of ones and the matrix Z;
a lower-right matrix of the augmented matrix is equal to a number of samples in the plurality of samples;
identifying one or more most-relevant features from the plurality of features by iteratively applying a sweep operation to the augmented matrix;
training a classification model using the most-relevant features from the plurality of features rather than all of the plurality of features;
using the classification model to derive a classification for an entity; and
performing, as part of at least one of an information-management system, an information-security system, and an endpoint-security system, a security action based at least in part on the classification.

2. The computer-implemented method of claim 1, wherein training the classification model comprises training the classification model to distinguish entities that are malicious from entities that are benign.

3. The computer-implemented method of claim 1, wherein training the classification model comprises training the classification model to distinguish entities that have been compromised from entities that have not been compromised.

4. The computer-implemented method of claim 1, wherein the most-relevant features comprise a subset of the plurality of features that, when used to train the classification model, contribute most to a reduction of an error of the classification model.

5. The computer-implemented method of claim 1, wherein identifying the most-relevant features from the plurality of features comprises ranking the one or more most-relevant features.

6. The computer-implemented method of claim 1, wherein:
   identifying the most-relevant features from the plurality of features comprises identifying the most relevant feature from the plurality of features by:
      applying, to an initial state of the augmented matrix for each feature from the plurality of features that is represented in the augmented matrix, the sweep operation to the augmented matrix;
      determining which application of the sweep operation resulted in the lowest value in the lowest rightmost element of the augmented matrix;
   the most relevant feature comprises the feature that is associated with the application of the sweep operation that resulted in the lowest value in the lowest rightmost element of the augmented matrix.

7. The computer-implemented method of claim 6, wherein:
   identifying the most-relevant features from the plurality of features comprises identifying the second most relevant feature from the plurality of features by:
      generating a second state of the augmented matrix by applying the sweep operation to the augmented matrix;
      reapplying, to the second state of the augmented matrix for each remaining feature from the plurality of features, the sweep operation to the augmented matrix;
      determining which reapplication of the sweep operation resulted in the lowest value in the lowest rightmost element of the augmented matrix;
   the second most relevant feature comprises the remaining feature from the plurality of features that is associated with the reapplication of the sweep operation that resulted in the lowest value in the lowest rightmost element of the augmented matrix.

8. The computer-implemented method of claim 1, wherein the classification model comprises an ordinary least squares support vector machine.

9. The computer-implemented method of claim 1, wherein the classification model comprises a support vector machine.

10. The computer-implemented method of claim 1, wherein the classification model comprises a decision tree.

11. A system for selecting features for classification, the system comprising:
   a component-generating module, stored in memory, that generates a matrix X, a column vector Y, and a matrix Z from a training dataset, wherein:
      the training dataset comprises:
         a plurality of samples;
         a classification for each sample;
      each sample within the training dataset has a value for each of a plurality of features of the samples;
      each row of the matrix X represents one of the plurality of samples;
      each column of the matrix X represents one of the plurality of features;
      each row of the column vector Y represents the classification for the one of the plurality of samples;
      the matrix Z is generated by multiplying each row of the matrix X with the classification contained in the corresponding row of the column vector Y;
   a matrix-generating module, stored in memory, that generates an augmented matrix from the matrix X, the column vector Y, and the matrix Z such that:
      an upper-left matrix of the augmented matrix is equal to a product of a transpose of the column vector Y and the column vector Y;
      an upper-middle matrix of the augmented matrix is equal to a product of the transpose of the column vector Y and the matrix Z;
      an upper-right matrix of the augmented matrix is equal to a product of the transpose of the column vector Y and a matrix of ones;
      a middle-left matrix of the augmented matrix is equal to a product of a transpose of the matrix Z and the column vector Y;
      a middle matrix of the augmented matrix is equal to a sum of an identity matrix and a product of a transpose of the matrix Z and the matrix Z;
      a middle-right matrix of the augmented matrix is equal to a product of a transpose of the matrix Z and the matrix of ones;
      a lower-left matrix of the augmented matrix is equal to a product of a transpose of the matrix of ones and the column vector Y;
      a lower-middle matrix of the augmented matrix is equal to a product of a transpose of the matrix of ones and the matrix Z;
      a lower-right matrix of the augmented matrix is equal to a number of samples in the plurality of samples;
   an identifying module, stored in memory, that identifies one or more most-relevant features from the plurality of features by iteratively applying a sweep operation to the augmented matrix;
   a training module, stored in memory, that trains a classification model using the most-relevant features from the plurality of features rather than all of the plurality of features;
   at least one of an information-management system, an information-security system, and an endpoint-security system that:
      uses the classification model to derive a classification for an entity; and
      performs a security action based at least in part on the classification; and
   at least one processor that executes the component-generating module, the matrix-generating module, the identifying module, and the training module.

12. The system of claim 11, wherein the training module trains the classification model by training the classification model to distinguish entities that are malicious from entities that are benign.

13. The system of claim 11, wherein the training module trains the classification model by training the classification model to distinguish entities that have been compromised from entities that have not been compromised.

14. The system of claim 11, wherein the most-relevant features comprise a subset of the plurality of features that, when used to train the classification model, contribute most to a reduction of an error of the classification model.

15. The system of claim 11, wherein the identifying module identifies the most-relevant features from the plurality of features by ranking the one or more most-relevant features.

16. The system of claim 11, wherein:
   the identifying module identifies the most relevant feature from the plurality of features by:

applying, to an initial state of the augmented matrix for each feature from the plurality of features that is represented in the augmented matrix, the sweep operation to the augmented matrix;

determining which application of the sweep operation resulted in the lowest value in the lowest rightmost element of the augmented matrix;

the most relevant feature comprises the feature that is associated with the application of the sweep operation that resulted in the lowest value in the lowest rightmost element of the augmented matrix.

17. The system of claim 16, wherein:

the identifying module identifies the second most relevant feature from the plurality of features by:

generating a second state of the augmented matrix by applying the sweep operation to the augmented matrix;

reapplying, to the second state of the augmented matrix for each remaining feature from the plurality of features, the sweep operation to the augmented matrix;

determining which reapplication of the sweep operation resulted in the lowest value in the lowest rightmost element of the augmented matrix;

the second most relevant feature comprises the remaining feature from the plurality of features that is associated with the reapplication of the sweep operation that resulted in the lowest value in the lowest rightmost element of the augmented matrix.

18. The system of claim 11, wherein the classification model comprises an ordinary least squares support vector machine.

19. The system of claim 11, wherein the classification model comprises a support vector machine.

20. A non-transitory computer-readable medium comprising one or more computer-executable instructions that, when executed by at least one processor of a computing device, cause the computing device to:

generate a matrix X, a column vector Y, and a matrix Z from a training dataset, wherein:

the training dataset comprises:
a plurality of samples;
a classification for each sample;

each sample within the training dataset has a value for each of a plurality of features of the samples;

each row of the matrix X represents one of the plurality of samples;

each column of the matrix X represents one of the plurality of features;

each row of the column vector Y represents the classification for the one of the plurality of samples;

the matrix Z is generated by multiplying each row of the matrix X with the classification contained in the corresponding row of the column vector Y;

generate an augmented matrix from the matrix X, the column vector Y, and the matrix Z such that:

an upper-left matrix of the augmented matrix is equal to a product of a transpose of the column vector Y and the column vector Y;

an upper-middle matrix of the augmented matrix is equal to a product of the transpose of the column vector Y and the matrix Z;

an upper-right matrix of the augmented matrix is equal to a product of the transpose of the column vector Y and a matrix of ones;

a middle-left matrix of the augmented matrix is equal to a product of a transpose of the matrix Z and the column vector Y;

a middle matrix of the augmented matrix is equal to a sum of an identity matrix and a product of a transpose of the matrix Z and the matrix Z;

a middle-right matrix of the augmented matrix is equal to a product of a transpose of the matrix Z and the matrix of ones;

a lower-left matrix of the augmented matrix is equal to a product of a transpose of the matrix of ones and the column vector Y;

a lower-middle matrix of the augmented matrix is equal to a product of a transpose of the matrix of ones and the matrix Z;

a lower-right matrix of the augmented matrix is equal to a number of samples in the plurality of samples;

identify one or more most-relevant features from the plurality of features by iteratively applying a sweep operation to the augmented matrix;

train a classification model using the most-relevant features from the plurality of features rather than all of the plurality of features;

use the classification model to derive a classification for an entity; and perform, as part of at least one of an information-management system, an information-security system, and an endpoint-security system, a security action based at least in part on the classification.

* * * * *